Aug. 17, 1937.   O. E. BANKER   2,089,931
PIPE FITTER'S WRENCH
Filed March 12, 1936
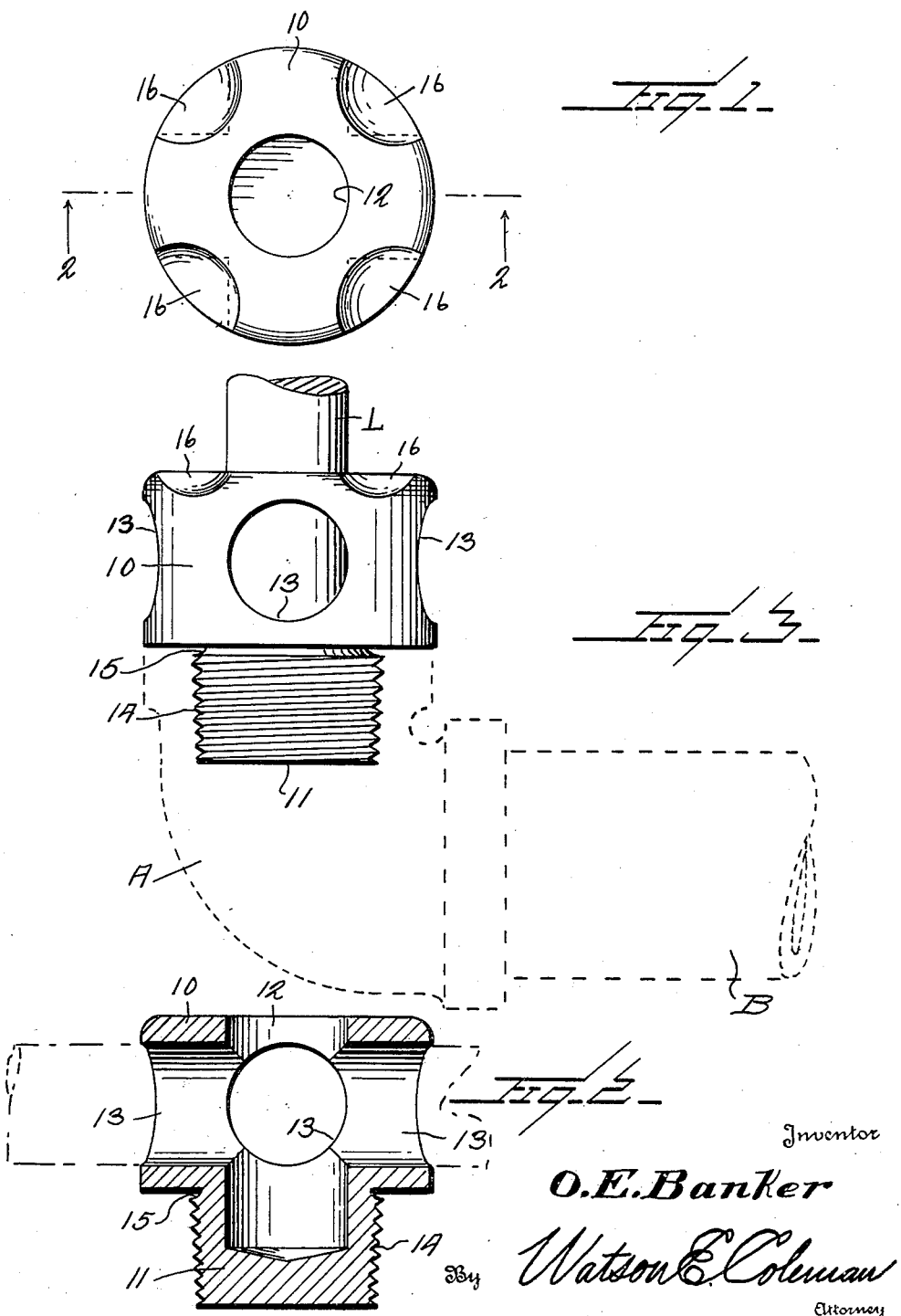
Inventor
O. E. Banker
By Watson E. Coleman
Attorney Patented Aug. 17, 1937

2,089,931

UNITED STATES PATENT OFFICE 2,089,931

PIPE FITTER'S WRENCH

Olin E. Banker, Wilkes-Barre, Pa.

Application March 12, 1936, Serial No. 68,555

1 Claim. (Cl. 81—71)

This invention relates to tools for turning on and off pipe fittings such as bushings, L's and T's, and particularly to a device of this character, which is provided with a head having apertures for the reception of a rod acting as a lever and which below the head is provided with a threaded tapered shank for insertion within and engagement with the interior threads of the pipe fitting, such as a bushing, L or T.

Another object is to provide a device of this character which may be made in different sizes to correspond to different sizes of pipe fitting, which may be very cheaply formed, which is so constructed that the head will fit up closely against the fitting being turned, and which will eliminate the use of wrenches for the purpose of turning on and off these fittings, and thus eliminate the danger of a wrench slipping, which is the cause of many accidents in the plumbing and pipe fitting trades.

My invention is illustrated in the accompanying drawing wherein:

Figure 1 is a top plan view of my wrench;

Figure 2 is a section on the line 2—2 of Figure 1;

Figure 3 is an elevation of the wrench in applied position upon an L shown in dotted lines.

Referring to this drawing, it will be seen that my wrench or tool comprises a head 10 and a tapered integral shank 11. The head 10 is formed with an axial passage or opening 12, and intersecting this passage or bore are a plurality of radial passages 13. The bore 12 intersects the radial passages or bores 13 and preferably, these passages will all have a diameter of 1 3/32" so that a lever or rod of slightly smaller diameter may be inserted in these bores to permit the device to be turned. The shank 11 is concentric to the bore 12 and is, of course, smaller in diameter than the head and tapered away from the head. The shank is screw threaded at 14 with a pipe thread. At the junction of the shank 14 with the head 10, there is an annular groove 15 formed, this annular groove providing a clearance for the last thread, thereby permitting the shank to screw up tightly against the fitting. The threaded portion 14 will be slightly smaller than the standard pipe size. The shank 11 is to be threaded to fit various pipe sized fittings. Preferably, the metal of the head is cut away as for instance, at the points designated 16, so as to lighten the casting. This casting is also lightened by the longitudinal bore 12.

In Figure 3, I have illustrated the manner in which this device is to be used where an L A is to be screwed onto or unscrewed from a pipe B. The shank 11 is to be screwed into the mouth of the L, as illustrated, until the head 10 bears against the rim of the mouth and then a lever composed of a piece of pipe or anything of this nature, designated L, may be inserted in the bore 12, and the pipe fitting A may then be screwed on or screwed off the pipe B with very little trouble and no chance of slippage.

My device may be used on L's or T's of any angle, on service L's, on bushings, on straight type valve fittings, etc.

It will be seen that by the provision of a central bore 12 and radial bores 13, that a lever may be applied either to rotate the wrench and the pipe fitting axially, or rotate an L or T around the axis of a pipe B.

The tool is particularly designed to tighten or loosen pipe fittings which are ordinarily made of cast iron, these cast iron fittings being liable to break or crack when a wrench is applied thereto. The device can be used on 75% of the work ordinarily requiring the use of a wrench. It is quickly applied and saves time over the use of the common pipe wrench. On polished pipe fittings it eliminates marring the polished surface of the pipe fitting which occurs when a wrench is applied thereto, and will prevent the crushing or deformation of the pipe fitting.

What is claimed is:—

A wrench of the character described, comprising a head and an integral centrally disposed shank less in diameter than the head and extending therefrom, the shank being tapered and threaded for engagement with the standard threads of a pipe fitting, the shank at its junction with the head being formed with a clearance groove, the head having a plurality of passages disposed at right angles to the rotative axis of the shank and head and radial to said axis and having a passage extending axially of the head and shank intersecting said radial passages and extending entirely through the head and into the shank.

OLIN E. BANKER.